United States Patent
Igari

(10) Patent No.: US 6,742,094 B2
(45) Date of Patent: May 25, 2004

(54) SYSTEM FOR ACCESS CONTROL TO HIDDEN STORAGE AREA IN A DISK DRIVE

(75) Inventor: Fubito Igari, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 10/059,108

(22) Filed: Jan. 31, 2002

(65) Prior Publication Data

US 2002/0103964 A1 Aug. 1, 2002

(30) Foreign Application Priority Data

Jan. 31, 2001 (JP) .................................. 2001-023362

(51) Int. Cl.⁷ .............................................. G06F 12/14
(52) U.S. Cl. ...................................... 711/163; 713/202
(58) Field of Search .......................... 711/163, 164; 713/202

(56) References Cited

U.S. PATENT DOCUMENTS

| | | | | |
|---|---|---|---|---|
| 4,947,318 A | * | 8/1990 | Mineo | 713/200 |
| 5,081,676 A | * | 1/1992 | Chou et al. | 705/55 |
| 5,161,256 A | * | 11/1992 | Iijima | 235/380 |
| 5,412,717 A | | 5/1995 | Fischer | |
| 5,802,591 A | | 9/1998 | Yachida | |
| 6,094,486 A | | 7/2000 | Marchant | |
| 6,286,087 B1 | * | 9/2001 | Ito et al. | 711/164 |
| 2002/0040418 A1 | * | 4/2002 | Bress et al. | 711/112 |
| 2002/0077992 A1 | * | 6/2002 | Tobin | 705/65 |

FOREIGN PATENT DOCUMENTS

EP   1 022 659 A2   7/2000

* cited by examiner

Primary Examiner—Hiep T. Nguyen
(74) Attorney, Agent, or Firm—Pillsbury Winthrop LLP

(57) ABSTRACT

A disclosed disk drive has a disk assigned with a plurality of hidden storage areas. The disk drive includes an authentication module which performs authentication processing for each hidden storage area in response to an access request from a host system. The authentication module exchanges information with the host system and performs authentication processing to determine access permission for each hidden storage area by using key information and unique information defined for each hidden storage area.

9 Claims, 5 Drawing Sheets

SYSTEM FOR ACCESS CONTROL TO HIDDEN STORAGE AREA IN A DISK DRIVE

CROSS-REFERENCE TO RELATED APPLICATIONS

This application is based upon and claims the benefit of priority from the prior Japanese Patent Application No. 2001-023362, filed Jan. 31, 2001, the entire contents of which are incorporated herein by reference.

BACKGROUND OF THE INVENTION

1. Field of the Invention

The present invention relates to a disk drive and particularly to a security technology using a hidden storage area provided on a disk storage medium.

2. Description of the Related Art

In recent years, particular attention is paid to the information service system which distributes content data such as images (motion and still pictures), sound, etc. or programs from the Internet or digital broadcasting networks. In such a system, distributed data is downloaded to digital devices including a personal computer and is saved in a storage medium installed on the digital device. Digital devices include a digital television, a PDA (personal digital assistant), a portable telephone, and a mobile reproduction device, etc.

The storage medium installed on the digital device can be a memory card comprising flash EEPROM or disk drive such as a hard disk drive (HDD) or a magnet-optical disk drive (MO drive).

The information service system must use the security feature for protecting the copyright of content data or programs, especially for copy protection. This security feature includes an authentication feature which specifies part of storage medium areas as a hidden storage area for performing authentication when the hidden storage area is accessed. When an access request is issued to the hidden storage area, the authentication feature executes an authentication process for determining whether to permit the access.

Conventionally, security systems including various authentication methods are developed for a system using a memory card e.g. comprising flash EEPROM. By contrast, a system using a disk drive such as an HDD provides various security systems for a host system (digital device itself), but offers limited security features for the disk drive itself.

The security feature applied to the conventional disk drive comprises the authentication feature which uses the specified storage area on the disk as a hidden storage area and restricts accesses to the hidden storage area. Normally, the hidden storage area stores key information needed for encryption/decryption processing. This key information is used for encrypting or decrypting content data stored in a normal storage area without access restrictions.

Generally, the authentication method employed for conventional memory cards etc. uses one type of authentication process to enable or disable accesses to the hidden storage area. Since the memory card has a limited storage capacity, the hidden storage area is also limited. Normally, a single authentication process is sufficient for the authentication method.

However, a disk drive has a large storage capacity. It is possible to provide a plurality of hidden storage areas on the disk. If different authentication methods can be assigned to respective hidden storage areas on the disk, it is possible to improve the security feature for the entire disk drive.

BRIEF SUMMARY OF THE INVENTION

It is an object of the present invention to provide an effective security feature for a plurality of hidden storage areas on the disk and improve the security feature for the entire disk drive.

In accordance with one aspect of the present invention, there is provided a disk drive including an authentication system for access control to hidden storage areas in a disk.

The disk drive comprises: a disk storage medium having a plurality of access limited hidden storage areas other than a normal storage area; a controller which, in response to a request to access each of the hidden storage areas from an external system, performs authentication processing for determining access permission for each of the hidden storage areas by using specific authentication information defined for each of the hidden storage areas; and a read/write mechanism which performs a read/write operation for the disk storage medium under control of the controller and performs a read/write operation for each of the hidden storage areas only when an access is permitted according to a result of the authentication processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described in further detail with reference to the accompanying drawings.

Disk Drive Configuration

Figure 1:
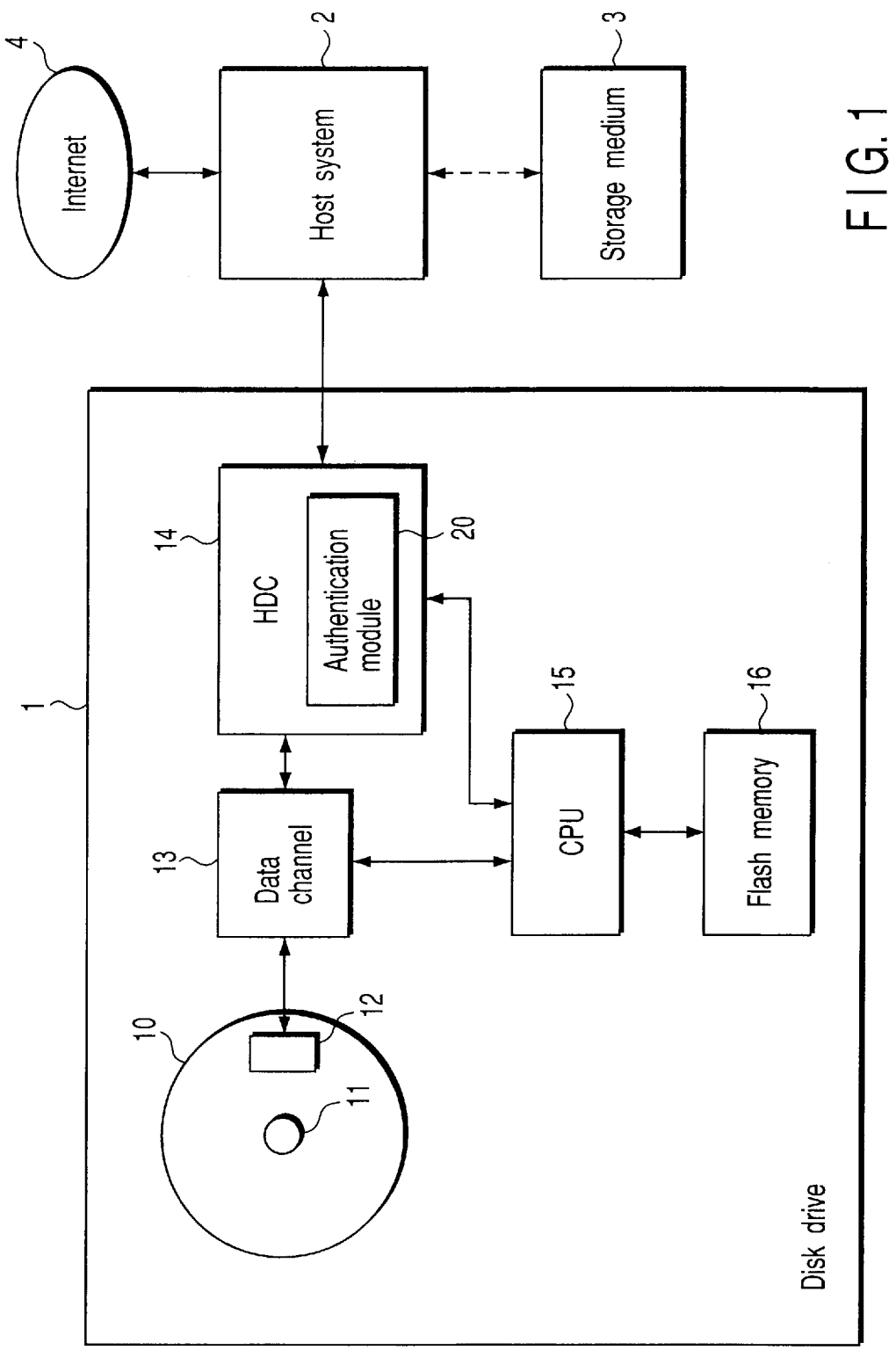
FIG. 1 is a block diagram showing the main part of a disk drive according to an embodiment of the present invention.

As shown in FIG. 1, this embodiment assumes a digital device comprising a disk drive 1 and a host system 2. The disk drive 1 is e.g. a hard disk drive and mainly performs a read/write operation in response to commands from the host system 2.

The host system 2 chiefly comprises a micro-processor and various application programs stored on the disk drive 1, for example. The host system 2 is connected to the Internet 4, a digital network, etc. The host system 2 has a capability of downloading content data (e.g. music or image data) and programs distributed from these networks to the disk drive 1.

Further, the host system 2 is provided with a decryption feature to decrypt encrypted data in the downloaded distributed data and the security feature including a copy protection feature etc. to prevent the distributed data from being copied. Moreover, the host system 2 has a copy feature to copy content data read from the disk drive 1 or distributed from the Internet 4 to a storage medium 3 such as a memory card. This storage medium 3 is used as a replaceable storage medium for a PDA, a mobile reproduction device, etc.

The disk drive 1 includes a disk 10 as a data storage medium, a head 12 for reading or writing data to the disk 10, a data channel 13, a disk controller (HDC) 14, a CPU 15, and flash memory (EEPROM) 16. The disk drive 1 also contains memory such as RAM and ROM, although not shown, as well as the flash memory 16.

Under control of the CPU 15, a spindle motor 11 fast rotates the disk 10 during a read/write operation. The head 12 is mounted on an actuator (not shown). The CPU 15 executes servo control to drive the actuator and position the head 12 to a target position (access position) on the disk 10.

The data channel 13 is a read/write signal processing circuit and has a decoder feature to input a signal read by the head 12 from the disk 1 and restore this signal to the original data. The data channel 13 also has an encoder feature to convert write data from the HDC 14 to an encoded signal. The HDC 14 provides an interface (e.g. ATA interface specification) between the disk drive 1 and the host system 2 and controls transfer of various commands and data to the host system 2. The HDC 14 contains an authentication module 20 associated with the authentication feature according to this embodiment.

Figure 6:
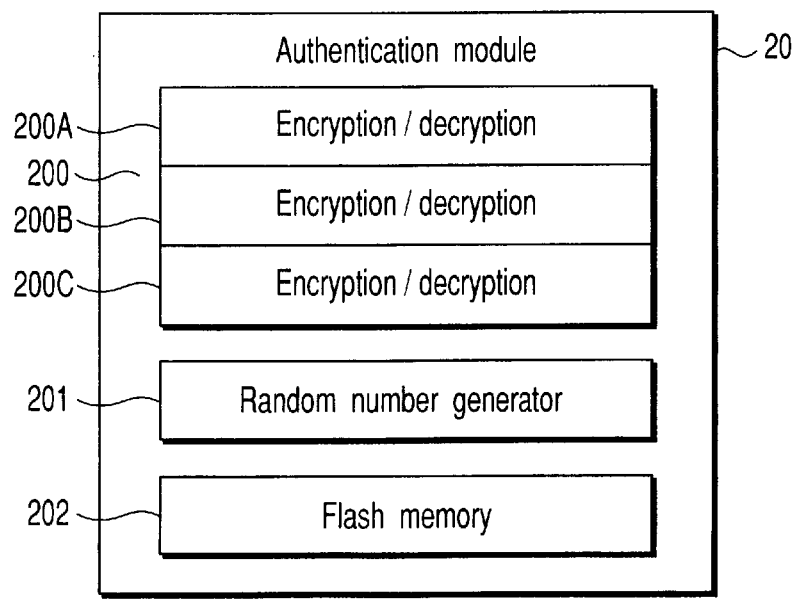
FIG. 6 is a block diagram showing the configuration of an authentication module according to the embodiment.

The authentication module 20 is hardware comprising special-purpose LSI. More specifically, the authentication module 20, as shown in FIG. 6, includes an encryption/decryption circuit 200, a random number generator 201, and flash memory 202 for storing key data etc. needed for encryption/decryption processing. As will be described later, the encryption/decryption circuit 200 has a plurality of types of encryption/decryption circuit sections 200A through 200C. The encryption/decryption circuit 200 can be configured to store a plurality of types of encryption/decryption programs (200A through 200C) and supply the CPU 15 with these programs. In this case, the CPU 15 executes an encryption/decryption program to perform authentication processing or encryption/decryption processing according to this embodiment.

Figure 3:
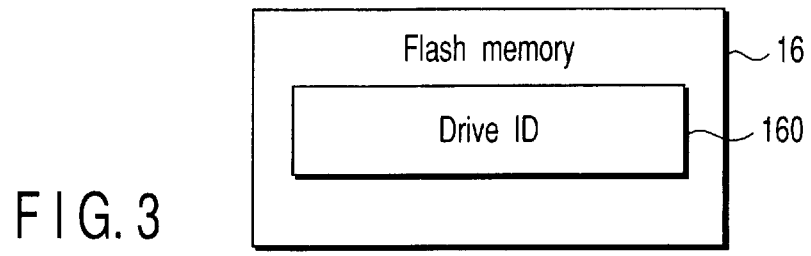
FIG. 3 shows a storage content of flash memory according to the embodiment.

The CPU 15 is the main control element for the drive 1 and performs authentication processing related to the security feature in addition to read/write control and servo control. As shown in FIG. 3, the flash memory 16 is nonvolatile memory for storing unique information (drive ID) 160 about the drive 1 needed for authentication processing. The flash memory 16 can be used to store key information etc. needed for authentication processing or encryption/decryption processing.

Disk Configuration

Figure 2:
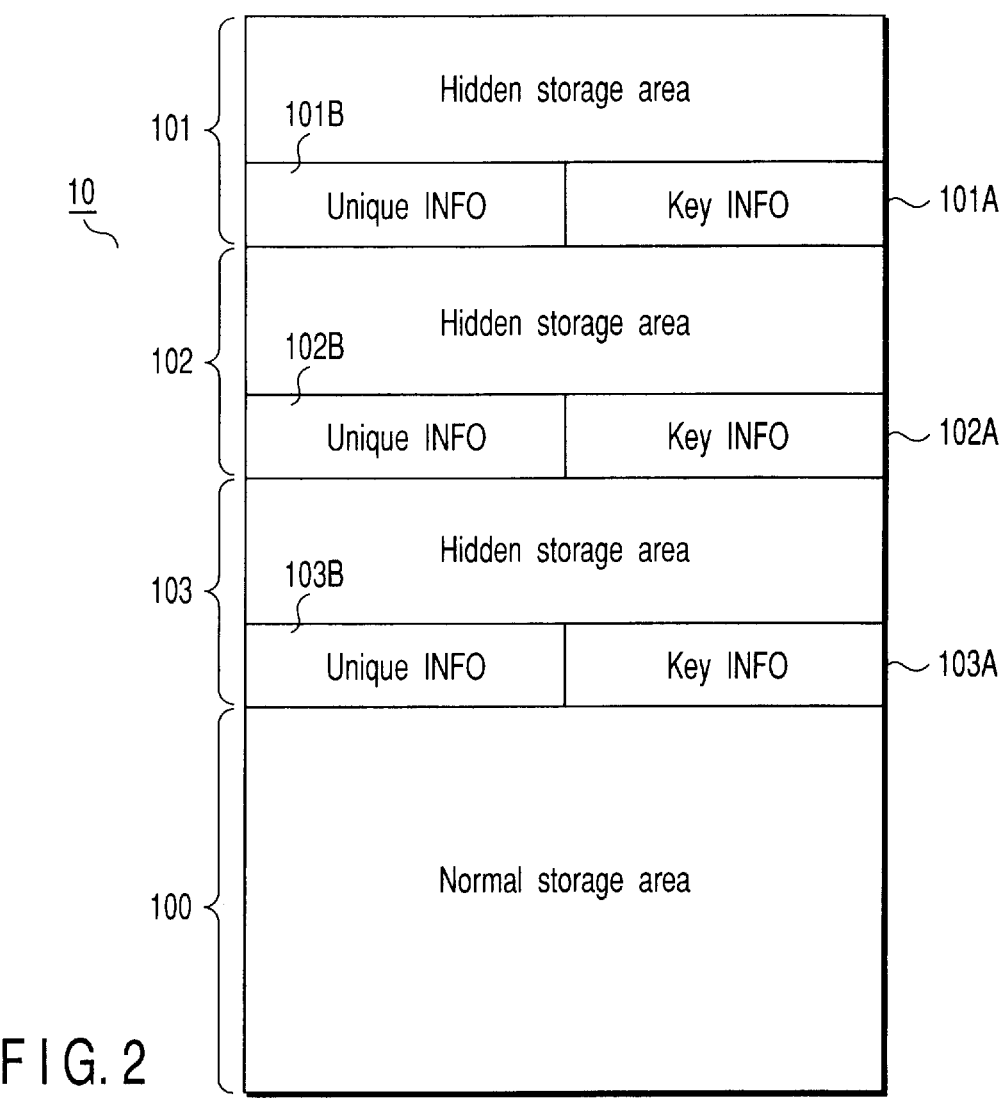
FIG. 2 shows the configuration of a storage area on a disk according to the embodiment.

As shown in FIG. 2, this embodiment provides a plurality of hidden storage areas (three areas 101 through 103 in this embodiment) in a specified storage area, e.g., an inner periphery area on the disk. The hidden storage areas 101 through 103 are access limited special storage areas which are defined by e.g. setup commands from the host system 2. Excluding the hidden storage areas 101 through 103 from all storage areas on the disk 10 leaves a normal storage area 100. This storage area is free from access limitations and is capable of normal read/write operations.

Generally, the normal storage area 100 stores content data (distributed data) downloaded from the Internet 4 etc. When the content data is encrypted, it cannot be used as is and is consequently copy protected.

The hidden storage areas 101 through 103 are used for decrypting encrypted content data or storing key information etc. needed to encrypt content data. Further, the hidden storage areas 101 through 103 include areas for storing key information 101A through 103A needed for authentication associated with access requests in the respective areas and areas for storing unique information (to be described) 101B through 103B about the corresponding areas. The authentication processing according to this embodiment uses the key information 101A through 103A, unique information 101B through 103B, and a drive ID 160 stored in the flash memory 16.

Authentication Processing

Figure 4:
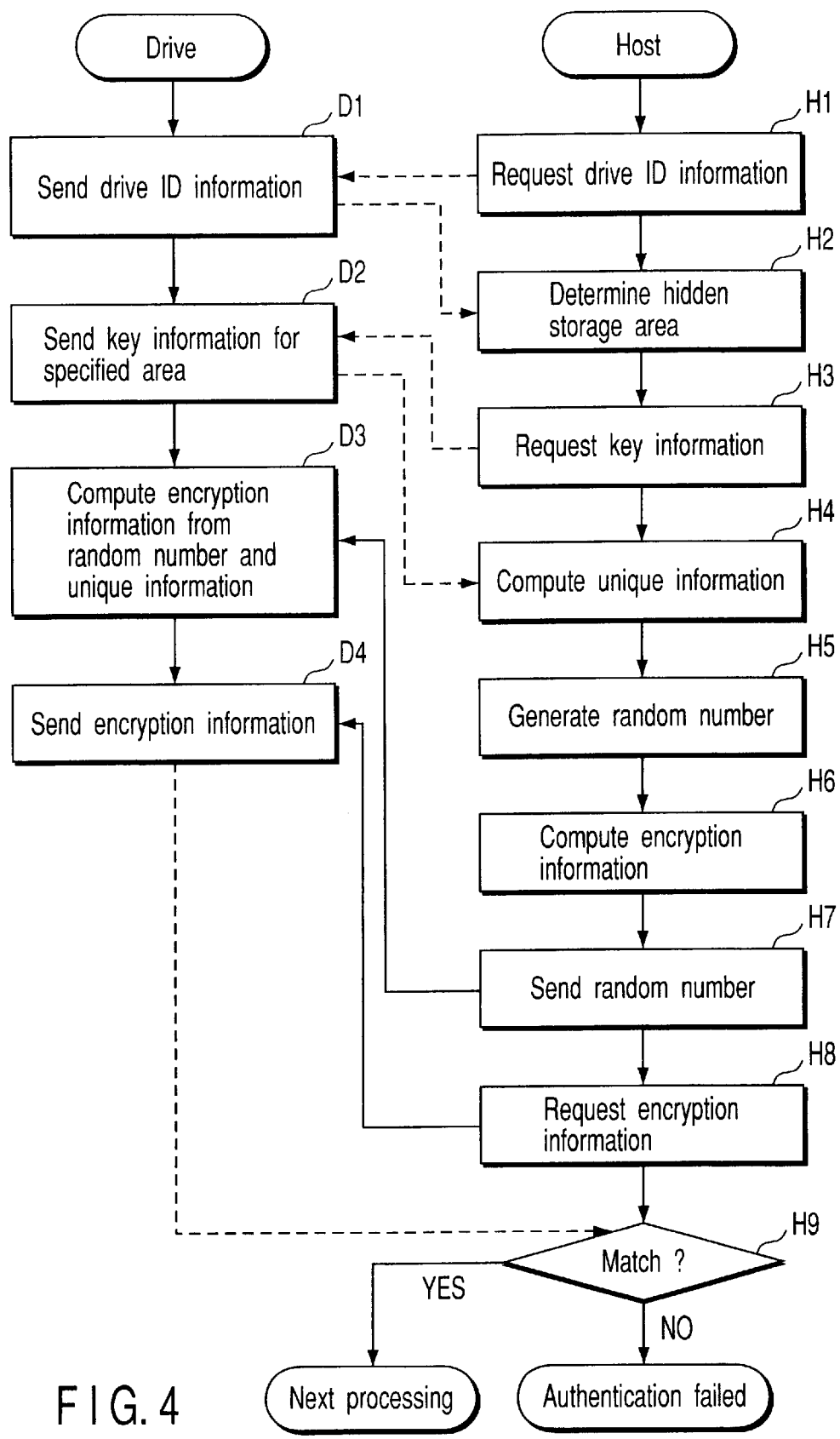
FIGS. 4 and 5 are flowcharts for explaining authentication processes according to the embodiment.
Figure 5:
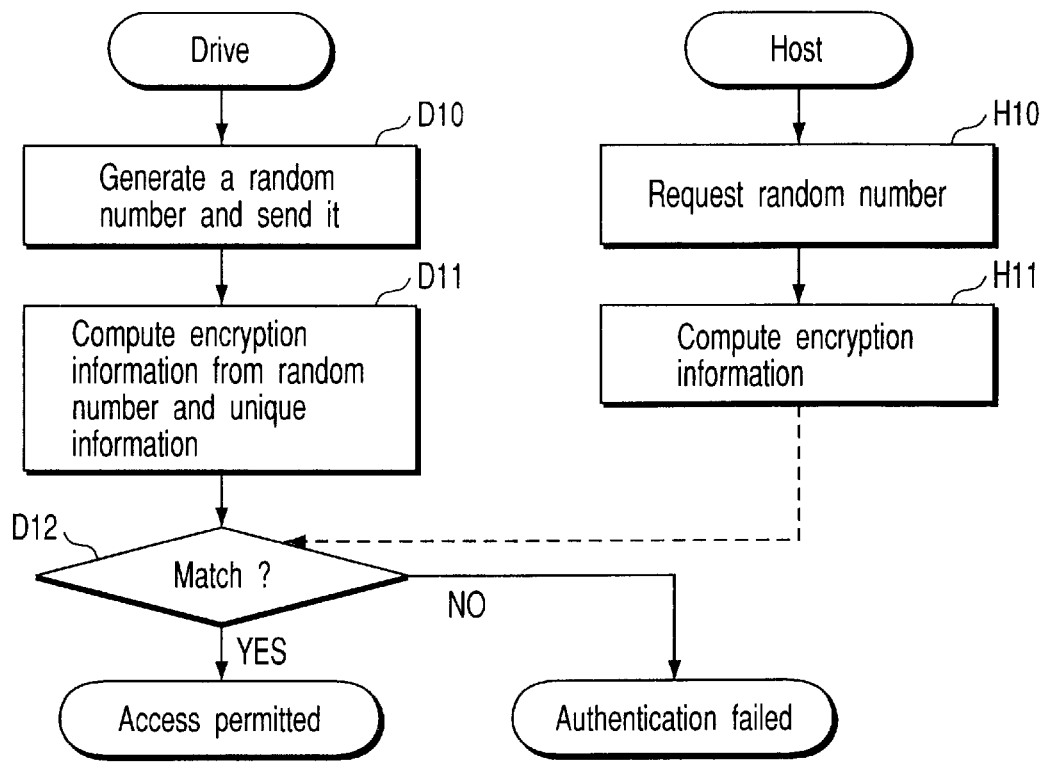

The following describes authentication processing according to this embodiment with reference to flowcharts in FIGS. 4 and 5. FIGS. 4 and 5 show a procedure for the disk drive 1 and that for the host system 2 parallel to each other. A dotted line indicates exchange of information or commands between the disk drive 1 and the host system 2.

Here, the host system 2 downloads encrypted content data (e.g. music data) from the Internet 4 and stores it onto the disk 10 of the disk drive 1. The content data is stored in the normal storage area 100 on the disk 10 of the disk drive 1.

It is assumed that the host system 2 decrypts the content data (encrypted data) accessed from the disk drive 1 and copies it to the storage medium 3 such as a memory card. The host system issues an access request to the disk drive 1 in order to obtain key information used for the decryption processing from a specified hidden storage area (101 in this example) on the disk 10. In response to this access request, the disk drive 1 executes specified authentication processing to determine whether to permit the access. The following chiefly describes the procedure of the host system 2 with reference to FIG. 4.

When the host system 2 requests to read the drive ID 160 for identifying the drive 1, the drive 1 sends the drive ID 160 stored in the flash memory 16 to the host system 2 (steps H1 and D1). The disk drive 1 uses the HDC 14 and the CPU 15 to transfer data and information to the host system 2.

The host system 2 then selects the hidden storage area 101 to be accessed and requests to read key information 101A for the hidden storage area 101 (steps H2 and H3). In response to this request, the drive 1 reads the key information 101A from the specified hidden storage area 101 on the disk 10 and sends it to the host system 2 (step D2).

The host system 2 provides a specified decryption function section (encryption/decryption program) with the read drive ID 160 and key information 101A and computes (decrypts) unique information (information equivalent to 101B) corresponding to the hidden storage area 101 (step H4). Namely, the authentication feature according to this embodiment allows the drive 1 and the host system 2 to maintain the common unique information 101B without transmitting the unique information 101B corresponding to the hidden storage area 101 from the drive 1 to the host system 2. Accordingly, this authentication feature ensures high security without leaking the unique information 101B needed for the authentication procedure to access the hidden storage area 101.

Further, the host system 2 generates a random number (pseudo-random number) from a random number generation function section (random number generation program). The host system 2 provides an encryption function section (encryption program) with the random number and the computed unique information to compute encryption information or an encryption result (steps H5 and H6). The host system 2 then sends the generated random number to the disk drive 1 (step H7).

On the disk drive 1, the authentication module 20 allows an encryption/decryption circuit 200, e.g., an encryption/decryption circuit section 200A (or program 200A) to perform encryption by using the generated random number and the unique information 101B. The authentication module 20 computes encryption information as an operation result (step D3). The drive 1 sends the computed encryption information to the host system 2 (step D4).

The host system 2 compares its computed encryption information with the encryption information obtained from the drive 1. If a match is found, the host system 2 assumes that both perform the same encryption procedure and the first authentication processing is successful (YES at step H9). If no match is found, both perform different encryption procedures. The authentication processing is unsuccessful, disabling the succeeding procedure (NO at step H9).

When the authentication processing succeeds for the host system 2, control proceeds to authentication processing for the disk drive 1. This authentication procedure is explained with reference to the flowchart in FIG. 5.

In response to a request for random number generation from the host system 2, the authentication module 20 of the drive 1 uses the random number generator 201 to generate a random number, normally a pseudo-random number (steps H10 and D10). The drive 1 sends the generated random number to the host system 2.

The host system provides the encryption function section (encryption program) with the random number received from the drive 1 and the unique information computed in the previous authentication procedure to compute the encryption information or an encryption result (step H11). The host system 2 sends the computed encryption information to the disk drive 1. In the disk drive 1, the authentication module 20 provides the encryption/decryption circuit 200 with the generated random number and the unique information 101B to perform encryption and compute encryption information as an operation result (step D11).

The authentication module 20 compares its computed encryption information with the encryption information obtained from the host system 2. If a match is found, the authentication module 20 assumes that the authentication processing is successful (YES at step D12). The disk drive 1 permits the access request for the hidden storage area 101 from the host system 2 and transfers information (key information needed for the decryption) read from the hidden storage area 101 to the host system 2. If the encryption information for the disk drive differs from that for the host system, the authentication module 20 assumes that the authentication processing is unsuccessful (NO at step D12). In this case, the disk drive 1 does not permit the access request from the host system 2 for the hidden storage area 101.

In short, when the encryption/decryption function type (e.g. circuit 200A) of the disk drive 1 matches that of the host system 2, the authentication method according to this embodiment permits an access to a hidden storage area (e.g. 101) corresponding to that encryption/decryption function type. Accordingly, it is possible to determine whether to permit accesses in different authentication processes for each of the hidden storage areas 101 through 103.

Since the unique information 101B through 103B used for authentication processing is provided for the hidden storage areas 101 through 103, each of these areas uses different authentication processing. In this case, the host system 2 uses the drive ID 160 and the key information 101A through 103A to compute the unique information 101B through 103B. Consequently, it is possible to ensure high security without leaking the unique information corresponding to each hidden storage area.

It is desirable to provide limitation of permitting only one access to the hidden storage areas 101 through 103. When the disk drive 1 reads the key information for encryption/decryption from the hidden storage area and sends it to the host system 2, this information is desirably encrypted with a random number transmitted at the authentication procedure from the security viewpoint.

According to this embodiment, the disk 10 stores the key information 101A through 103A and the unique information 101B through 103B defined for the hidden storage areas 101 through 103. A modification may be configured to store the key information 101A through 103A and the unique information 101B through 103B as well as the drive ID 160 in the flash memory 16.

As an application of this embodiment, the hidden storage areas 101 through 103 on the disk 10 can store key information corresponding to different encryption/decryption methods or different key information for content types. When a system using the disk drive according to this embodiment saves content data with different encryption/decryption methods, it is possible to obtain key information for decrypting the content data from any of hidden storage areas.

Updating the Key Information and the Unique Information

Figure 7:
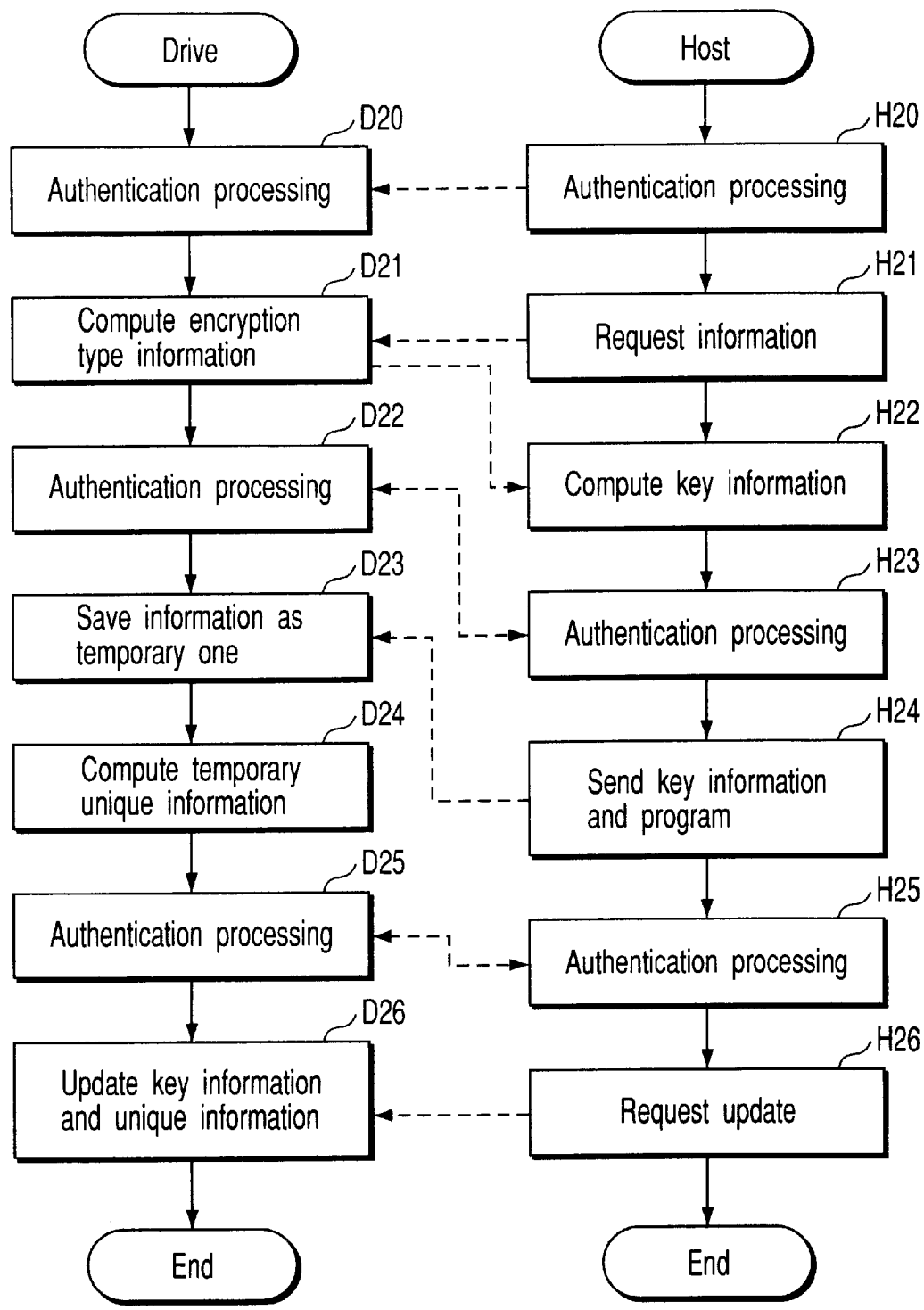
FIG. 7 is a flowchart for explaining a process of updating information included in the authentication feature according to the embodiment.

FIG. 7 is a flowchart showing the procedure for updating the key information 101A through 103A and the unique information 101B through 103B stored in the hidden storage areas 101 through 103 on the disk 10.

According to the above-mentioned authentication procedure executed between disk drive 1 and the host system 2, it is assumed that the host system 2 can access the specified hidden storage area 101 on the disk 10 (steps H20 and D20). The host system 2 requests information about types of encryption/decryption methods the disk drive 1 maintains (step H21). This information is hereafter referred to as the encryption type information. The encryption type information indicates the type of the encryption/decryption method for the encryption/decryption circuit 200 in the authentication module 20. Specifically, the encryption type information is equivalent to a method name or a program name.

The disk drive 1 sends the encryption type information indicating encryption/decryption method types owned by the authentication module 20 to the host system 2 (step D21). The host system 2 identifies encryption/decryption method types for the drive 1 from the received encryption type information. The host system 2 configures new key information (update information) by using an encryption procedure (system-supplied encryption program) corresponding to the method to be newly specified out of those indicated by the encryption type information (step H22). This new key information or update information corresponds to a hidden storage area (e.g. 101) specified by the host system.

After the above-mentioned authentication procedure is reexecuted, the host system 2 sends information (encryption method name) indicating the newly configured key information and its encryption procedure (encryption program name) to the disk drive 1 (step H24). The disk drive 1 receives the key information from the host system 2 and stores this information as temporary information in a specified area on the disk 10 or in the flash memory 16 (step D23). The disk drive 1 also stores information indicating the encryption procedure (encryption program) having the type specified by the host system in a specified area on the disk 10 or in the flash memory 16.

According to the encryption procedure of the method specified by the information from the host system, the disk drive 1 computes temporary unique information corresponding to the hidden storage area 101 by using the new key information and the drive ID supplied from the host system (step D24). Specifically, the encryption/decryption circuit 200 in the authentication module 20 performs an encryption is operation for computing temporary unique information according to the encryption procedure of the type specified by the information from the host system. More specifically, an appropriate encryption/decryption circuit (e.g. 200A) is selected from the encryption/decryption circuit 200 to perform an encryption operation.

The host system 2 and the disk drive 1 then perform the aforementioned authentication procedure (steps H25 and D25). At this time, the authentication procedure uses the key information and the unique information which are updated and temporary ones. The encryption procedure type (selected encryption/decryption circuit 200A) is specified from host system 2. When the encryption information from the disk drive 1 corresponds to that from the host system 2 according to this authentication procedure, the authentication processing succeeds. This means that the host system 2 and the disk drive 1 mutually ensure an update of the key information and the unique information corresponding to the specified hidden storage area 101.

The host system 2 requests the disk drive 1 to update new key information and unique information (step H26). In response to this, the disk drive 1 stores the temporary key information and the temporary unique information respectively as updated final information in specified areas allocated to the hidden storage area 101 (step D26). The authentication module 20 sets an encryption/decryption circuit corresponding to the encryption procedure (encryption program) of the type specified from the host system 2.

The aforementioned update feature can update the key information 101A through 103A and the unique information 101B through 103B corresponding to the hidden storage areas 101 through 103 which are defined at an initial stage. Accordingly, this can ensure high security for hidden storage areas on the disk 10.

It is desirable to provide a feature to restore the hidden storage areas to an initial state at the shipment of disk drive products. In this case, the key information and the unique information are also initialized. From the security viewpoint, it is desirable to erase information stored in hidden storage areas at the time of initialization.

When updating the relevant key information, the disk drive 1 according to this embodiment computes unique information from that key information and updates the unique information corresponding to the hidden storage area specified by the host system 2. Accordingly, changing the encryption/decryption method enables to change the authentication procedure for the corresponding hidden storage area which maintains key information needed for encryption/decryption processing.

In this embodiment, the authentication module 20 may be configured to store a plurality of types of encryption/decryption programs in the internal flash memory 202 and allow the encryption/decryption circuit 200 to execute the selected encryption/decryption program. Further, the embodiment may be configured so that, instead of the hardware authentication module 20, the CPU 15 uses a program stored in the flash memory 16 to perform authentication and update processing according to the embodiment.

As mentioned above, this embodiment can provide a plurality of hidden storage areas on the disk and determine permission of accesses in different authentication processing for respective hidden storage areas. Because of this, a system using the disk drive according to this embodiment can store key information corresponding to different types of encryption/decryption methods or different key information for content types in individual hidden storage areas. Accordingly, it is possible to provide digital devices capable of ensuring an advanced security feature. Moreover, it is possible to improve security for hidden storage areas by providing a feature of updating key information and unique information corresponding to the hidden storage areas.

For example, the disk drive according to this embodiment is applicable to a card-type or mobile disk drive used as a replaceable storage device for a personal computer, PDA, etc. and a server storage apparatus used for the Internet or LAN.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of an authentication for access control to hidden storage areas in a disk storage medium, said method comprising:

performing authentication processing to determine access permission for each of said hidden storage areas by using specific authentication information defined for each of said hidden storage areas when an external system requests an access to each of said hidden storage areas; and performing a read/write operation for each of said hidden storage areas on said disk storage medium only when an access is permitted as a result of said authentication processing wherein each specific authentication information includes unique information defined for each hidden storage area and key information for generating encryption information including said unique information; and said authentication processing performs a specified encryption operation by using a random number and said unique information corresponding to a hidden storage area to be accessed;

sends said key information and said random number to said external system in order to compute information equivalent to said unique information;

receives an encryption result using information equivalent to said random number and said unique information from said external system; and compares an encryption result from said external system with an encryption result from said encryption device and performs determination processing to permit an access to a hidden storage area when a match is found and to reject an access when no match is found.

2. A method of an authentication for access control to hidden storage areas in a disk storage medium, said method comprising:

performing authentication processing to determine access permission for each of said hidden storage areas by using specific authentication information defined for each of said hidden storage areas when an external system requests an access to each of said hidden storage areas; and performing a read/write operation for each of said hidden storage areas on said disk storage medium only when an access is permitted as a result of said authentication processing, wherein specific authentication information includes unique information defined for each hidden storage area, key information for generating encryption information including said unique information, and a drive ID for computing said unique information by means of decryption processing common to each hidden storage area through the use of said key information; and said authentication processing performs a specified encryption operation by using a random number and said unique information corresponding to a hidden storage area to be accessed;

sends said key information, said drive ID, and said random number to said external system;

receives an encryption result from said external system when said external system performs decryption processing using said key information and said drive ID to compute information equivalent to said unique information and performs an encryption operation using said information and said random number; and compares an encryption result from said external system with an encryption result from said encryption device and performs determination processing to permit an access to a hidden storage area when a match is found and to reject an access when no match is found.

3. A disk drive comprising:

a disk storage medium having a plurality of access limited hidden storage areas other than a normal storage area;

a controller which, in response to a request to access each of said hidden storage areas from an external system, performs authentication processing for determining access permission for each of said hidden storage areas by using specific authentication information defined for each of said hidden storage areas; and a read/write mechanism which performs a read/write operation for said disk storage medium under control of said controller and performs a read/write operation for each of said hidden storage areas only when an access is permitted according to a result of said authentication processing, wherein each specific authentication information includes unique information defined for each hidden storage area and key information for generating encryption information including said unique information.

4. The disk drive according to claim 3, wherein said controller includes an identification module for executing said identification processing; and said identification module performs a specified encryption operation by using a random number and said unique information corresponding to a hidden storage area to be accessed;

sends said key information and said random number to said external system in order to compute information equivalent to said unique information;

receives an encryption result using information equivalent to said random number and said unique information from said external system; and compares an encryption result from said external system with an encryption result from said encryption device and performs determination processing to permit an access to a hidden storage area when a match is found and to reject an access when no match is found.

5. The disk drive according to claim 4, wherein said identification module generates a random number or a pseudo-random number and sends it to said external system.

6. The disk drive according to claim 3, wherein said controller updates said key information and said unique information in response to an update request from said external system.

7. A disk drive comprising:

a disk storage medium having a plurality of access limited hidden storage areas other than a normal storage area;

a controller which, in response to a request to access each of said hidden storage areas from an external system, performs authentication processing for determining access permission for each of said hidden storage areas by using specific authentication information defined for each of said hidden storage areas; and a read/write mechanism which performs a read/write operation for said disk storage medium under control of said controller and performs a read/write operation for each of said hidden storage areas only when an access is permitted according to a result of said authentication processing, wherein specific authentication information includes unique information defined for each hidden storage area, key information for generating encryption information including said unique information, and a drive ID for computing said unique information by means of decryption processing common to each hidden storage area through the use of said key information.

8. The disk drive according to claim 7, wherein said controller includes an identification module for executing said identification processing; and said identification module performs a specified encryption operation by using a random number and said unique information corresponding to a hidden storage area to be accessed;

sends said key information, said drive ID, and said random number to said external system;

receives an encryption result from said external system when said external system performs decryption processing using said key information and said drive ID to compute information equivalent to said unique information and performs an encryption operation using said information and said random number; and compares an encryption result from said external system with an encryption result from said encryption device and performs determination processing to permit an access to a hidden storage area when a match is found and to reject an access when no match is found.

9. The disk drive according to claim 7, wherein said controller updates said key information and said unique information in response to an update request from said external system.

* * * * *